United States Patent [19]

Hauguel

[11] Patent Number: 4,735,298
[45] Date of Patent: Apr. 5, 1988

[54] AUTOMATIC WEAR COMPENSATOR FOR A MOTOR VEHICLE CLUTCH

[75] Inventor: Fabrice J. N. Hauguel, Beauchamp, France

[73] Assignees: Automobiles Peugeot, Paris; Automobiles Citroen, Neuilly-sur-Seine, both of France

[21] Appl. No.: 889,394

[22] Filed: Jul. 25, 1986

[30] Foreign Application Priority Data

Jul. 26, 1985 [FR] France .................. 85 11498

[51] Int. Cl.⁴ ........................... F16D 13/75
[52] U.S. Cl. ................... 192/111 A; 192/99 S; 188/196 A
[58] Field of Search ........... 192/111 A, 111 R, 70.25, 192/99 S, 30 V; 188/71.8, 196 A

[56] References Cited

U.S. PATENT DOCUMENTS

| | | | |
|---|---|---|---|
| 2,421,869 | 6/1947 | Brock | 192/111 A |
| 3,286,803 | 11/1966 | Zeidler | 192/111 A |
| 3,581,849 | 6/1971 | Landgraf | 188/71.8 X |
| 3,765,522 | 10/1973 | Dahlkvist et al. | 192/111 A |
| 3,946,845 | 3/1976 | Kamio | 192/111 A |
| 4,239,098 | 12/1980 | Jacoponi | 192/111 A |
| 4,270,646 | 6/1981 | Norcross | 192/111 A |
| 4,420,988 | 12/1983 | Deligny | 192/111 A X |
| 4,463,843 | 8/1984 | Taig | 192/111 A |
| 4,556,137 | 12/1985 | Abe | 192/111 A |

FOREIGN PATENT DOCUMENTS

| | | |
|---|---|---|
| 2317209 | 10/1974 | Fed. Rep. of Germany . |
| 590962 | 8/1947 | United Kingdom . |
| 2035499 | 6/1980 | United Kingdom ........ 192/99 S |

Primary Examiner—Rodney H. Bonck
Assistant Examiner—Richard M. Lorence
Attorney, Agent, or Firm—Burns, Doane, Swecker & Mathis

[57] ABSTRACT

The compensator comprises at least an element coupled to a clutch mechanism and an element coupled to a declutching control lever. According to the invention, one of the elements is formed by a cylindrical body (17) filled with a hydraulic fluid, in which is axially slidable a sleeve (20), and the other of the elements is constituted by a piston (21) axially slidable inside the sleeve (20).

6 Claims, 3 Drawing Sheets

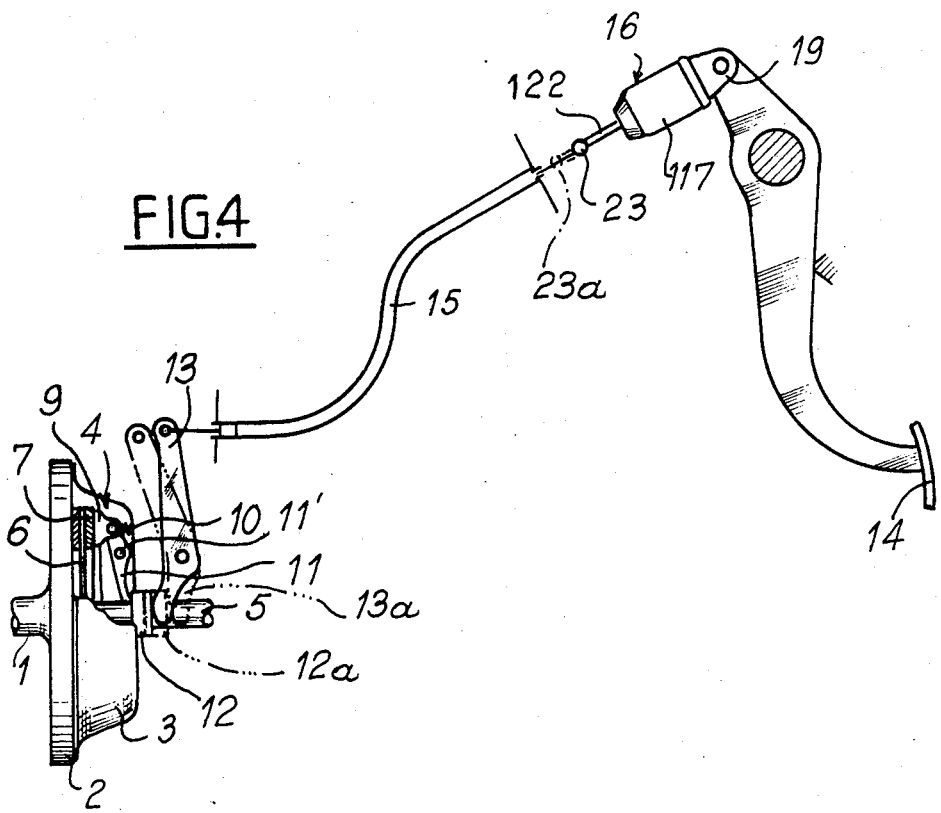
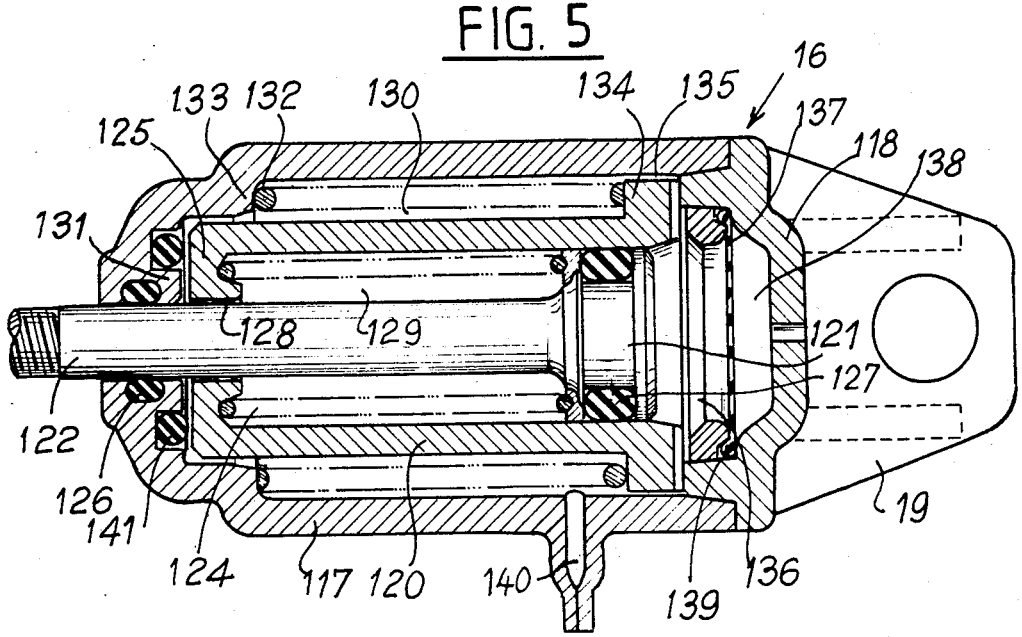

AUTOMATIC WEAR COMPENSATOR FOR A MOTOR VEHICLE CLUTCH

The present invention relates to an automatic wear compensator for a motor vehicle clutch.

It is known that the successive declutching operations effected in the course of the driving of a motor vehicle gradually wear out the friction linings of the clutch disc which results in a progressive displacement of the fixing point of the clutch cable on the clutch mechanism and consequently a progressive change in the clutch pedal in its position of rest. This position progressively rises from its initial position by a distance which may reach several centimeters and there is a resulting discomfort for the driver of the vehicle.

Wear compensators are known for maintaining the pedal in a constant position of rest. For example FR-A-2 422 998 discloses a wear compensator disposed between the clutch mechanism and the clutch pedal of a vehicle. This compensator comprises a cylinder which follows in its displacements the declutching abutment of the clutch mechanism and is capable of sliding axially on a tube coupled to the pedal by the clutch cable. The cylinder is filled with a hydraulic liquid and is divided into two chambers which communicate with each other through a flow limiting conduit so that, outside the clutch operations, the cylinder moves relative to the tube through a distance which compensates for the wear of the friction linings, the pressure of the fluid in the two chambers being balanced by a circulation through said conduit.

However, a compensator such as that described hereinbefore has drawbacks. In particular, in the course of the declutching operations, during the transmission of the force exerted by the driver, from the tube to the cylinder, an undesired slight flow of fluid occurs from one chamber to the other, which results in a slight relative displacement of the cylinder and tube and therefore of the pedal which does not correspond to a compensation of the wear of the friction linings.

The invention overcomes the aforementioned drawback. The invention provides an automatic wear compensator having a hydraulic dashpot for a motor vehicle clutch comprising at least an element coupled to the clutch mechanism and an element coupled to a declutching control lever on which a force is exerted upon each declutching operation, the two elements being capable of slowly sliding relative to each other apart from the declutching operations so as to compensate for the clearance due to the wear in the clutch mechanism, in which compensator the slow sliding of the two elements exactly compensates for the wear in the declutching mechanism and which is simple to construct and to mount on a vehicle clutch.

For this purpose, one of the elements is formed by a cylindrical body filled with a hydraulic fluid in which is axially slidable a sleeve, and the other of said elements is formed by a piston axially slidable in the sleeve.

According to another feature of the invention, the end of the sleeve comprises an annular conduit putting in communication a space located within the sleeve with a space located between the body and the sleeve, said end wall being maintained spaced away from the end wall of the body by elastically yieldable means, outside the declutching operations, so as to permit a slow displacement of the piston corresponding to the wear of the clutch but being applied against the body upon each declutching operation so as to avoid any flow of fluid through the annular conduit.

In a preferred embodiment of the compensator according to the invention, the body is closed by a cover comprising a flexible wall defining, on one hand, with the piston, a space and, on the other hand, with the end wall of the cover, a chamber filled with air.

Further features and advantages of the invention will be apparent from the following description of a preferred embodiment which is given solely by way of example and shown in the accompanying drawings. In the drawings:

FIG. 4 is a view identical to FIG. 1 of another arrangement of the automatic wear compensator;

FIG. 5 is a longitudinal sectional view to an enlarged scale of the wear compensator of FIG. 4.

Figure 1:
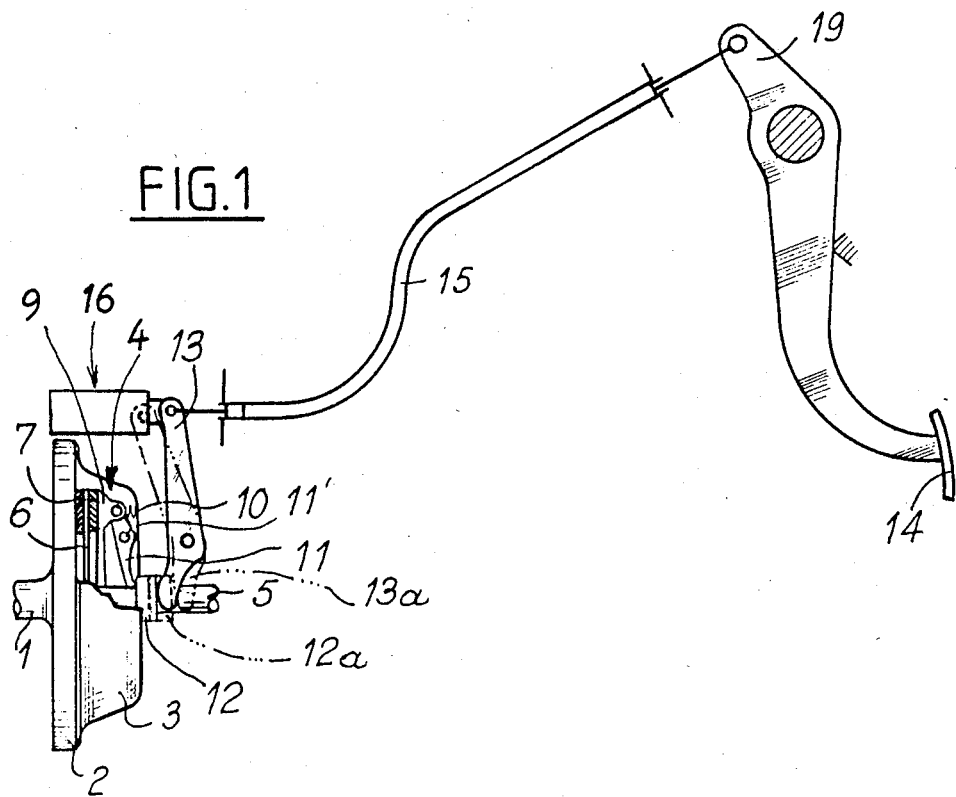
FIG. 1 is a side elevational view, partly in section, of a motor vehicle clutch provided with an automatic wear compensator according to the invention.

The clutch shown in FIGS. 1 and 4 comprises, in the conventional manner, a crankshaft 1 of an engine coupled with a flywheel 2 on which is fixed a clutch housing 3. The clutch housing 3 contains a clutch mechanism generally designated by the reference numeral 4 and controlling the disengagement of the clutch between the crankshaft 1 and a primary shaft 5 of a gear box (not shown).

The clutch mechanism 4 comprises a clutch disc 6 whose two sides carry friction linings 7 and which is coupled to the primary shaft 5 of the gear box. The clutch disc 6 is gripped between the flywheel 2 and a pressure plate 9 by springs 10 which bear against the inner wall of the clutch housing 3.

Levers 11 are connected by one of their ends to the pressure plate 9 while their other end bears against a clutch abutment 12 which is movable and supported by the primary shaft 5 of the gear box. These levers 11 are pivotable about pins 11' in opposition to the action of the springs 10 so as to disengage the pressure plate 9 from the clutch disc 6 and uncouple the shaft 5 and crankshaft 1. The levers 11 are made to pivot by movements of translation of the declutching abutment 12 along the shaft 5, these movements being brought about by the pivoting of a fork member 13 which bears against the declutching abutment 12 and is coupled to the clutch pedal 14 through a cable 15.

In the embodiment shown in FIG. 1, the wear compensator according to the invention carrying the reference numeral 16 is located on the opposite side of the fork member 13 to the cable 15.

Figure 2:
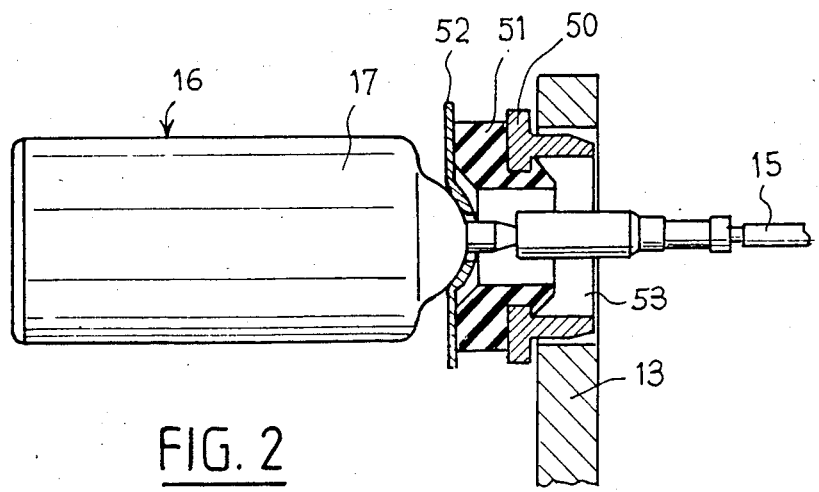
FIG. 2 is a side elevational view, partly in section and to an enlarged scale, of the mounting of the wear compensator on the clutch.

This wear compensator 16 comprises a cylindrical body 17 which bears against the fork member 13 through two concentric rings 50, 51 and a washer 52 (FIG. 2). The two rings 50, 51, and the washer 52 are provided with a central orifice 53 for the passage of the cable 15.

The cylindrical body 17 filled with a hydraulic fluid is closed by a cover 18, for example by screwing or fastening means. The cover 18 defines an end wall for the cylindrical body 17. A sleeve 20 is axially slidable inside the body 17 and a piston 21 connected to a rod 22 fixed to the cable 15 is axially movable inside the sleeve 20 in opposition to the action of a spring 24 bearing against the end wall 25 of the sleeve 20 and the piston 21.

A seal is provided, on one hand, between the cylindrical body 17 and the rod 22 of the piston 21 by an O-ring 26 and, on the other hand, between the piston 21 and the sleeve 20 by an O-ring 27.

The inner end wall 25 of the sleeve 20 is provided with a bore in which is slidable the rod 22 and whose diameter has been made sufficiently large to constitute an annular conduit 28 putting the space 29 inside the sleeve 20 in communication with the space 30 between the body 17 and the sleeve 20.

The sleeve 20 is, in the position of rest, maintained spaced away from the end wall 31 of the body 17 by a spring 32 which bears at one of its ends against the body 17 through a ring 33 and at the other end against a shoulder 34 provided about midway of the length of the sleeve 20. In the region of the shoulder 34, the respective diameters of the sleeve 20 and the body 17 are so arranged as to constitute an annular passage 35 which puts the space 30 in communication with the space 36 between the piston 21 and the cover 18.

The cover 18 is provided with a flexible wall such as a diaphragm 37 which defines between the end wall of the cover 18 and the diaphragm 37 a chamber 38 filled with air; this diaphragm 37 is deformable so as to compensate for variations in the volume of the chamber 38 when the piston 21 moves. A conduit 40 is provided in the wall of the body 17 so as to fill the latter with a hydraulic fluid : preferably, the body 17 is made from a plastics material and the conduit 40 may be easily closed after filling.

The clutch just described operates in the following manner:

When the pedal 14 is depressed, the cable 15 is displaced and drives the compensator 16 to the right as viewed in FIG. 1, which causes the fork member 13 to pivot in the clockwise direction and shift the clutch abutment 12 to the left, rotate the lever 11 in the clockwise direction and disengage the pressure plate 9 from the clutch disc 6 and thereby uncouple the crankshaft 1 from the primary shaft 5, i.e., cause the disengagement of the clutch.

When the driver lifts his foot from the pedal 14, the cable 15 is shifted, the compensator moves to the left and permits the lever 13, the declutching abutment 12 and the lever 11 to resume their position of rest. The spring 10 urges the pressure plate 9 against the clutch disc 6 and thus once again couples the crankshaft 1 with the primary shaft 5, i.e. produces the engagement of the clutch.

When the friction linings 7 of the clutch have been used for a certain period of time, they become worn and produce a progressive displacement of the pressure plate 9 toward the clutch disc 6, in the position of rest, i.e. in the engaged clutch position. The position of rest of the lever 11 is displaced at the same time in the counter-clockwise direction. The declutching abutment 12 assumes the position of rest indicated in dotted lines in FIG. 1 by the reference numeral 12a while the fork member 13 assumes the position of rest 13 and urges to the left the compensator 16. The body 17 therefore moves toward the left and shifts, under the action of the spring 32, the sleeve 20 which slides on the piston 21. This displacement causes the fluid to flow from the space 29 to the space 30 through the annular conduit 28; as a consequence, there is a similar flow from the space 30 to the space 36 through the annular passage 35. However, the volume liberated in the space 36 is greater than the volume of fluid which flows through the annular conduit 28 and therefore than the volume of fluid which flows through the annular conduit 35, the difference corresponding to the product of the section of the rod 22 by the displacement of the piston 21. Consequently, there is a progressive deformation of the diaphragm 37 which becomes convex, its convexity facing toward the piston 21.

The flows of fluid through the annular conduits and 35 are of course very slow, the displacements of the piston 21 occurring very progressively as the wear of the friction linings increases until the pressures of the fluid in the two spaces 29 and 30 are balanced. The position of rest of the piston 21 of course undergoes no displacement and the pedal 14 maintains a constant position of rest.

Figure 3:
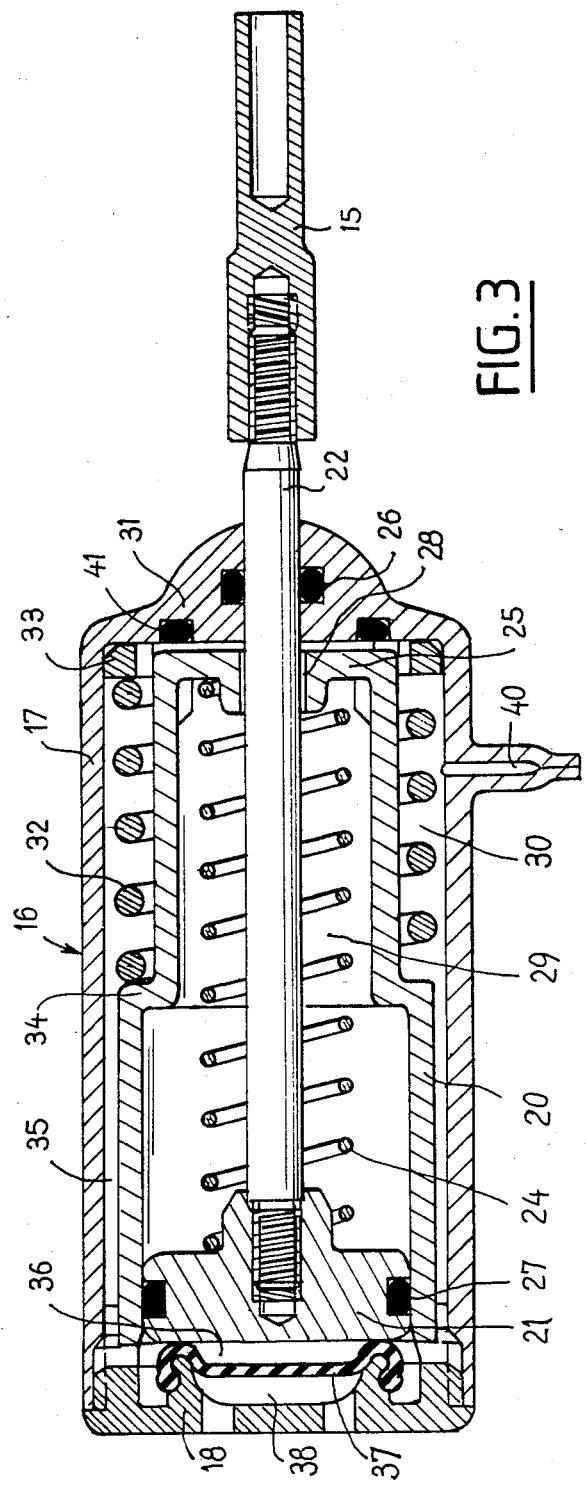
FIG. 3 is a longitudinal sectional view to an enlarged scale of the wear compensator of FIG. 1.

During the declutching operations, no undesirable flow of fluid can occur, since, when the piston 21 is shifted toward the right, as viewed in FIG. 3, the end wall 25 of the sleeve 20 comes to bear against the end wall 31 of the body 17 under the action of the spring 24 and thus closes the annular conduit 28, the seal being ensured by an O-ring 41.

In the modification shown in FIGS. 4 and 5, the wear compensator according to the invention, carrying the reference numeral 16, is interposed between the declutching cable 15 and the pedal 14. This wear compensator 16 comprises a cylindrical body 117 closed by a cover 118 and rigid with a fork member 19 in which the pedal 14 is pivotally engaged. It also includes a sleeve 120 which is axially slidable inside the body 117 and a piston 121 connected to a rod 122 fixed to the cable 15 at 23 ; the piston being itself axially movable inside the sleeve 120 in opposition to the action of a spring 124 which bears against the end wall 125 of the sleeve 120 and against the piston 121.

A seal is provided, on one hand, between the cylindrical body 117 and the rod 122, by an O-ring 126, and, on the other hand, between the piston 121 and the sleeve 120, by an O-ring 127.

The end wall 125 of the sleeve 120 is provided with a bore in which is slidable the rod 122 defining an annular conduit 128 for putting the space 129 in communication with the space 130.

The sleeve 120 is, in its position of rest, maintained spaced away from the end wall 131 of the body 117 by a spring 132 which bears at one of its ends against a shoulder 133 provided in the body 117 and at the other end against a shoulder 134 provided on the sleeve 120. In the region of the shoulder 134, the respective diameters of the sleeve 120 and the body 117 are so arranged as to constitute an annular conduit 135 which puts the space 130 in communication with the space 136.

The cover 118 is provided with a diaphragm 137 which defines between the end wall of the cover 118 and the diaphragm 137 a chamber 138 filled with air. A seal between the space 136 and the chamber 138 is provided by an O-ring 139 combined with the diaphragm 137. A conduit, similar to the conduit 40 of FIG. 3, enables the body 117 to be filled with a hydraulic fluid.

When the friction linings 7 have been used, they become worn and thus produce, as in the foregoing embodiment, a displacement of the fork member 13 to 13a, so that the point of connection of the cable 15 to the rod 22 moves from 23 to 23a.

The piston 121 is also displaced to the left through the distance between the points 23 and 23a. The displacement of the piston 121 results in a flow of fluid from the space 129 to the space 130 through the annular conduit 128; consequently, there is a similar flow from the space 130 to the space 136 through the annular conduit 135. The diaphragm 137 is progressively deformed and becomes convex, its convexity facing toward the piston 121.

The flows of fluid through the annular conduits 128 and 135 are of course very slow, the displacements of the piston 129 occurring very progressively in accordance with the wear of the friction linings, until the pressures of the fluid in the two spaces 129 and 130 are balanced. The position of rest of the sleeve 120 and the body 117 of course undergoes no displacement and the pedal 14 remains in a constant position of rest.

During the declutching operations, no undesirable flow of fluid can occur, since, when the body 117 is shifted toward the right, as viewed in FIG. 4, the end wall 125 of the sleeve 120 comes to bear against the end wall 131 of the body 117 and thus closes the annular conduit 138, a seal being afforded by an O-ring 141.

The compensator just described in either embodiment has great advantages.

First of all, it permits an exact compensation of the wear of the friction linings, with no risk of undesirable displacement of the position of rest of the pedal; it is therefore very reliable and simple to achieve. The filling of the body with hydraulic fluid is very easy and a perfect seal is ensured. Further, it may be easily mounted on the clutch of a vehicle.

This wear compensator moreover enables the maximum tension of the cable 15 to be limited while always maintaining a pre-stressing in the latter owing to the action of the spring 24 or 124.

It must be understood that the scope of the invention is not intended to be limited to the embodiments just described.

Thus, in order to overcome the drawback relating to the partial vacuum which is progressively created in the space 36 or 136, the use of a diaphragm may be avoided, but, for example, an oil tank from which the quantity of oil corresponding to the volume liberated by the outward movement of the rod 22 or 122 must be provided.

Further, the annular conduit 28 or 128 may be provided in the end wall 20 or 120 independently of the bore in which the rod 22 or 122 slides; a sealing element is then provided for ensuring the seal between the end wall of the sleeve and the rod.

Other ways of filling the compensator with hydraulic fluid may be envisaged. For example, the various component parts of the compensator may be assembled in the hydraulic fluid and this assembly terminated by the closure of the body (17; 117) by the cover (18; 118), the conduit (40, 140) being then eliminated.

What is claimed is:

1. A hydraulically dampened wear compensator for a motor vehicle clutch including a clutch mechanism and a declutching control lever, said compensator comprising at least an element coupled to the clutch mechanism and an element coupled to the declutching control lever on which lever a force is exerted for each declutching operation, one of said elements being formed by a cylindrical body in which body is provided hydraulic fluid and an axially slidable sleeve movable relative to the cylindrical body, and the other of said elements being formed by a piston radially and axially inside the sleeve, a first chamber located on one side of the piston, a second chamber located on the other side of the piston, and the piston being sealingly arranged with the sleeve so hydraulic fluid does not flow between the first and second chambers through the piston or between the piston and the sleeve.

2. An automatic wear compensator for a motor vehicle clutch including a clutch mechanism and a declutching control lever, said compensator comprising at least an element coupled to the clutch mechanism and an element coupled to the declutching control lever on which lever a force is exerted for each declutching operation, one of said elements being formed by a cylindrical body in which body is provided hydraulic fluid and an axially slidable sleeve, and the other of said elements being formed by a piston inside the sleeve, wherein the body has an end wall, and the sleeve has an end wall with a bore that defines an annular conduit which puts a space located inside the sleeve in communication with a space located between the body and the sleeve, elastically yieldable means maintaining the end wall of the sleeve spaced away from the end wall of the body so as to permit a slow displacement of the piston corresponding to the wear of the clutch, the sleeve overcoming the elastically yieldable means such that the end wall of the sleeve is applied against the end wall of the body upon each declutching operation so as to avoid any flow of fluid through the annular conduit during said declutching operation.

3. An automatic wear compensator for a motor vehicle clutch including a clutch mechanism and a declutching control lever, said compensator comprising at least an element coupled to the clutch mechanism and an element coupled to the declutching control lever on which lever a force is exerted for each declutching operation, one of said elements being formed by a cylindrical body in which body is provided hydraulic fluid and an axially slidable sleeve, and the other of said elements being formed by a piston inside the sleeve, including, for closing the body, a cover having an end wall and including a flexible wall, a space defined between the end wall of the cover and the piston and a chamber filled with air defined between the flexible wall and the end wall of the cover.

4. An automatic wear compensator according to claim 2, comprising, for closing the body, a cover having an end wall and including a flexible wall, a space defined between the end wall of the cover and the piston and a chamber filled with air defined between the flexible wall and the end wall of the cover.

5. An automatic wear compensator for a motor vehicle clutch including a clutch mechanism and a declutching control lever, said compensator comprising at least an element coupled to the clutch mechanism and an element coupled to the declutching contol lever on which lever a force is exerted for each declutching operation, one of said elements being formed by a cylindrical body in which body is provided hydraulic fluid and an axially slidable sleeve, and the other of said elements being formed by a piston inside the sleeve, wherein the body includes a flexible wall, wherein a space is defined between the body and the sleeve, wherein a space is defined between the piston and the flexible wall, and wherein the sleeve includes a shoulder and defines with the body an annular conduit which puts the space located between the body and the sleeve in communication with the space located between the piston and the flexible wall.

6. An automatic wear compensator according to claim 5, wherein the sleeve has a length and the shoulder is provided in a position substantially midway of the length of the sleeve.

* * * * *